US006695783B2

(12) United States Patent
Henderson et al.

(10) Patent No.: US 6,695,783 B2
(45) Date of Patent: Feb. 24, 2004

(54) MULTILINE ULTRASOUND BEAMFORMERS

(75) Inventors: Derek Henderson, Mill Creek, WA (US); Brent Stephen Robinson, Kirkland, WA (US); James Moore, Kenmore, WA (US); David N. Roundhill, Bothell, WA (US); Gary Allen Schwartz, Seattle, WA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 369 days.

(21) Appl. No.: 09/746,165

(22) Filed: Dec. 22, 2000

(65) Prior Publication Data

US 2002/0082500 A1 Jun. 27, 2002

(51) Int. Cl.[7] .................................................. A61B 8/00
(52) U.S. Cl. ........................ 600/443; 600/447; 367/119; 367/103
(58) Field of Search ................................ 600/437–472; 367/119, 103

(56) References Cited

U.S. PATENT DOCUMENTS

| 4,173,007 A | | 10/1979 | McKeighen et al. | |
|---|---|---|---|---|
| 4,275,461 A | | 6/1981 | Sternick et al. | |
| 4,644,795 A | | 2/1987 | Augustine | |
| 5,268,877 A | * | 12/1993 | Odell ........................ | 367/103 |
| 5,318,033 A | | 6/1994 | Savord | |
| 5,345,426 A | | 9/1994 | Lipschutz | |
| 5,369,624 A | * | 11/1994 | Fukukita et al. ............. | 367/103 |
| 5,469,851 A | | 11/1995 | Lipschutz | |
| 5,522,391 A | | 6/1996 | Beaudin et al. | |
| 5,544,128 A | * | 8/1996 | Kim et al. ................... | 367/103 |
| 5,544,655 A | * | 8/1996 | Daigle ......................... | 600/447 |
| 5,623,928 A | * | 4/1997 | Wright et al. ............... | 600/447 |
| 5,685,308 A | | 11/1997 | Wright et al. | |
| 5,763,785 A | | 6/1998 | Chiang | |
| 5,827,188 A | | 10/1998 | Wright et al. | |
| 5,831,168 A | | 11/1998 | Shinomura et al. | |
| 5,905,692 A | * | 5/1999 | Dolazza et al. ............. | 367/103 |

FOREIGN PATENT DOCUMENTS

EP           0 441 044 A           8/1991

OTHER PUBLICATIONS

Pridham et al., "Digital Interpolation Beamforming for Low–Pass and Bandpass Signals," Proc. of IEEE, vol. 67, No. 6, Jun. 1979, pp. 904–919.
Mucci, "A Comparison of Efficient Beamforming Algorithms," IEEE Transactions on Acoustics, Speech and Signal Processing, vol. ASSP–32, No. 3, Jun. 1984, pp. 548–558.

* cited by examiner

*Primary Examiner*—Francis J. Jaworski
*Assistant Examiner*—William C. Jung
(74) *Attorney, Agent, or Firm*—W. Brinton Yorks, Jr.

(57) ABSTRACT

A digital multiline beamformer is provided which produces multiple receive beams in response to a single transmit event. An embodiment of the present invention includes a bulk delay which provides a common steering delay applicable to all of the beams received at one time. The bulk delay is succeeded by parallel filter processing paths which produce finely focused multiple beams simultaneously. In one embodiment a multiphase filter produces the samples for multiple beams, which is advantageous when the number of simultaneously produced beams is greater than the number of phases produced by the fine focus filter.

33 Claims, 9 Drawing Sheets

MULTILINE ULTRASOUND BEAMFORMERS

This invention relates to ultrasound beamformers which receive signals produced by the elements of an ultrasonic array transducer and delay and combine those signals to produce steered and focused ultrasound beams and, in particular, to multiline ultrasound beamformers which produce multiple receive beams or lines in response to a single transmitted wave event.

A number of architectures have been proposed for multiline ultrasound beamformers. The oldest and most basic approach is to use multiple single line beamformers which are operated in parallel, as shown in U.S. Pat. Nos. 4,644,795 (Augustine) and 5,318,033 (Savord). In such an arrangement each element of the transducer array is connected to a channel of each of the beamformers. Each of these channels applies delays to the signals from the element which are appropriate to steer and focus the beam being formed by the beamformer of which that channel is a part. The signals delayed by each channel of a beamformer are combined to form a uniquely steered and focused beam, and the multiple beams produced simultaneously by the parallel operated beamformers are used to form multiple lines of an ultrasound image.

A problem presented by this approach is the hardware and operational complexity of multiple parallel beamformers. A conventional single line beamformer for a 128-element transducer array has 128 individual processing channels which are coordinately operated, a complexity unto itself. When two such beamformers are operated in synchronism the hardware and control complexity approximately doubles. Consequently, the cost of such an approach can be significant.

Another architecture which addresses this problem is one which integrates the processing of multiple beams within each channel of the beamformer. An effective approach to integrated processing of multiple beams is to time multiplex the processing of the different beams within a channel as shown in U.S. Pat. No. 5,469,851 (Lipschutz). In a time multiplexed beamformer successive samples of each beam are time interleaved in a pipelined data stream. The processors in the channel rapidly alternate between the characteristics needed to process each beam and thereby process the successive samples each according to the requirements needed to form one of the beams. At the end of the process the samples of the beams are combined with the corresponding beam samples of the other channels to produce multiple time-interleaved beam samples. The beam samples are thereafter sorted out and used to form lines of an ultrasound image.

A drawback of this approach is that the pipelined data path which conducts the samples is necessarily bandlimited. The samples in a sampled-data system must satisfy the Nyquist criterion so that the sought-after echo data can be accurately recovered without aliasing. The data must furthermore be handled and processed in real time. These demands mean that the system designer must make compromises when designing such a system. In particular the designer must trade off the bandwidth or frequency of the transducer with which the multiline beamformer may operate in consideration of the sampling rate of the system as the number of beams being processed increases. As a result the beamformer is restricted to operation with only low frequency transducer probes when beamforming a significant number of beams. Furthermore, variable passband filters and decimation are needed to restrict the bandwidth of the received echo signals in each channel when higher order multiline is called for, which further increases the cost and complexity of the beamformer. It would be desirable to have a multiline beamformer architecture which does not require tradeoffs affecting performance during higher order multiline operation, and which obviates the need for variably controlled and decimating filters.

In accordance with the principles of the present invention, a digital multiline beamformer is provided which produces multiple receive beams in response to a single transmit event. An embodiment of the present invention includes a bulk delay which provides a delay applicable to all of the beams received at one time, and generally provides a common steering delay. The bulk delay is succeeded by parallel filter processing paths which produce the multiple beams simultaneously. The filter processing paths are capable of producing output samples of each beam at a fixed output data rate, regardless of the number of beams currently being processed. In various ones of the illustrated embodiments the filter processing paths utilize FIFO or delay registers and share or multiplex different taps of the delay registers. In other embodiments a single filter processing path produces the samples for multiple parallel beam paths.

Figure 1:
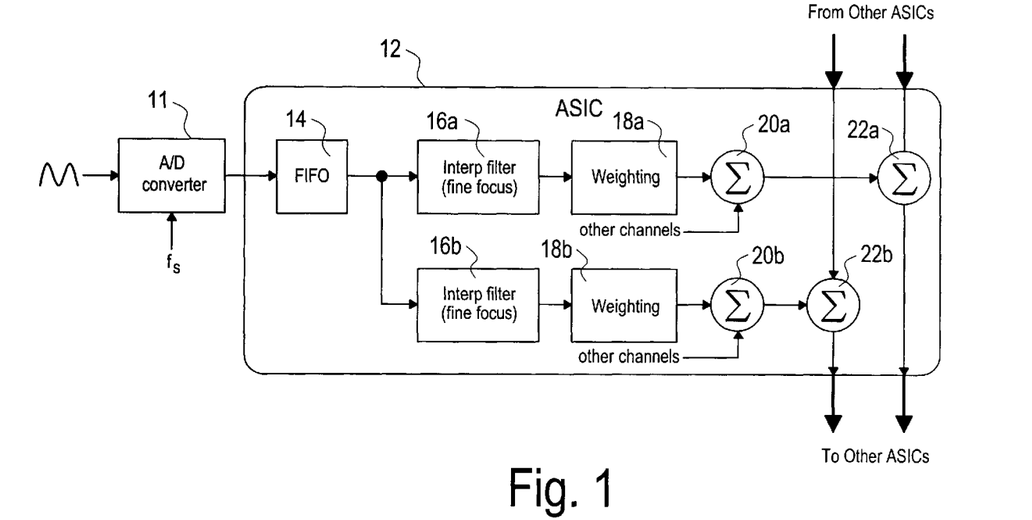
FIG. 1 illustrates in block diagram form an integrated circuit beamformer channel constructed in accordance with the principles of the present invention.

A multiline beamformer of the present invention comprises multiple channels, each associated with a particular transducer element of an array transducer. Referring first to FIG. 1, one such beamformer channel is shown in block diagram form. The echo signal received by a transducer element and shown at the left side of the drawing is amplified by analog circuitry (not shown) as is known in the art, then digitally sampled by an A/D converter 11 at a digital sampling rate of $f_s$. The sampling rate is chosen to satisfy the Nyquist criterion for the transducer bandwidths with which the beamformer is to be operated. For instance, if the beamformer is to be operated with a variety of transducers with a maximum upper band cutoff of 10 MHz, the digital sampling rate must be at least 20 MHz to avoid aliasing. If the upper band limit is 15 MHz, the sampling rate must be 30 MHz. Usually a higher sampling rate is used in consideration of the upper band rolloff; for instance, for transducers with a maximum upper band limit of 15 MHz, a 40 MHz sampling rate may be used.

The digital echo samples produced by the A/D converter are applied to digital circuitry constructed on an ASIC 12 (application-specific integrated circuit). The echo samples are initially delayed by a FIFO (first-in, first-out) delay line 14. The FIFO 14 provides a bulk delay to received echo signals which accounts for most of the steering delay from the multiple receive lines to the transducer element associated with the beamformer channel. The FIFO can be constructed as a serial multi-bit shift register of controllable length (e.g., tapped) or clock rate, or as a dual port random access memory with read and write addresses incremented by clock signals. The bulk delayed echo signals are then applied in parallel to interpolation filters 16a and 16b. Each of these interpolation filters produces delayed digital echo signals for one or more different receive beams or lines. For example, each interpolation filter can produce one line for a total of two multilines, or each can produce five time multiplexed lines for a total of ten multilines. The interpolation filters apply a unique fine focus delay (and a residual steering delay as needed) for properly phased samples of each of the multiple lines produced. They do this by interpolating a number of sequential signal samples produced by the FIFO 14 as described in further detail below. The delayed signal samples from the multiple beams are weighted by a desired receive apodization function by weighting circuits 18a and 18b which may be formed by multipliers or lookup tables. The signals of the respective multiple lines are summed with the respective delayed samples produced by other channels on the ASIC chip by summers 20a and 20b. An individual ASIC may have sixteen channels fabricated on it, for instance. These partial sum signals are then combined with the respective partial sum signals produced by the channels of other ASICs of the beamformer by summers 22a and 22b. The partial sum signals from one ASIC to the next can be transmitted either in parallel format or time-multiplexed parallel format. Alternatively a high speed serial format such as the LVDS standard (Low Voltage Differential Signalling) can be used, which reduces the number of pins on the ASIC needed to support the partial sum signals. A typical beamformer may have sixteen ASICs providing a total of 256 channels for a 256 element array, for instance. The final summers 22a and 22b of the cascade of channels provide beamformed output signals for multiple scanlines. In a constructed embodiment the beamformed data of the output scanlines is produced at a constant data rate, regardless of the frequency and bandwidth of the transducer currently being used with the beamformer, which eases the requirements on subsequent processing circuitry which thus only needs to accommodate one data rate. It is seen that the beamformer channel of FIG. 1 requires no programmable low-pass filtering and no decimation. Furthermore, the number of multiple lines which can be produced simultaneously is not compromised by the scanhead frequency or bandwidth, and it is therefore not necessary to trade off performance when multiple beams are being produced.

Figure 2:
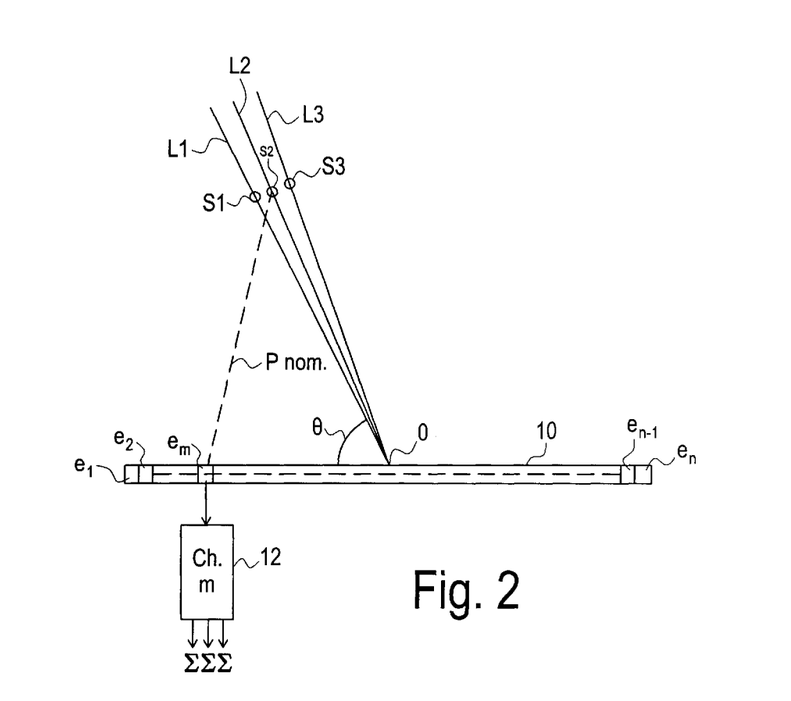
FIG. 2 illustrates the reception of ultrasound information from an image field by an array transducer using a multiline beamformer of the present invention.

FIG. 2 illustrates the operation of a beamformer of the present invention when receiving multiple beams simultaneously. An array transducer 10 comprises n transducer elements labeled $e_1$ through $e_n$. These elements transmit ultrasonic beams into the image field above the array as shown in the aforementioned Augustine patent, for instance. In response to a single transmit beam, multiple receive beams are obtained by a beamformer of the present invention which has channels coupled to receive signals from the n elements of the array. In the illustrated example three beams on lines L1, L2, and L3 are being received simultaneously, the paths of which have been previously insonified by a transmit beam. The three lines are seen to emanate from a common origin O on the face of the array 10; however this is not required. The lines could also emanate from different points on the face of the array and be referenced to a virtual apex origin behind the array as described in U.S. Pat. No. 5,123,415, or be arranged in parallel through the image field. The three lines are seen to be relatively closely spaced, which reduces the differences between the interpolation filter delays for the various multilines. A wider angular diversity of the simultaneously received lines will require more delay in the beamformer channels. The three lines are seen to be steered at a nominal steering angle or direction θ from the face of the array. In the drawing angle θ is the precise steering angle of the center line L2, with the other two lines having steering angles which are slightly less than and slightly greater than θ.

One channel 12 of the beamformer, channel m in this drawing, is coupled to receive signals from element em of the transducer array. (The A/D converter has been omitted from this drawing for ease of illustration.) A nominal path length $P_{nom.}$ to a point s2 on the center line L2 shows a nominal distance, and hence time-of-flight, to the group of three lines. The distances and hence times of flight to points s1 and s3 on the other two lines and equidistant from the origin O can be seen to be slightly less and slightly greater than the distance/time $P_{nom.}$. To account for these time and distance disparities the beamformer channel applies different delays to echoes from the three lines, so that echoes received from each element across the array will be aligned in time for each line and hence suitable for coherent summation and beam formation. For instance, after applying different delays to echoes received by element $e_m$ from points s1, s2, and s3, the echoes are brought into time alignment with the echoes received from the three points by the other elements of the array. The time aligned echo components from the three lines which are received by all of the elements of the active array aperture are then coherently summed as indicated by the summation outputs Σ of the channel m.

Figure 3:
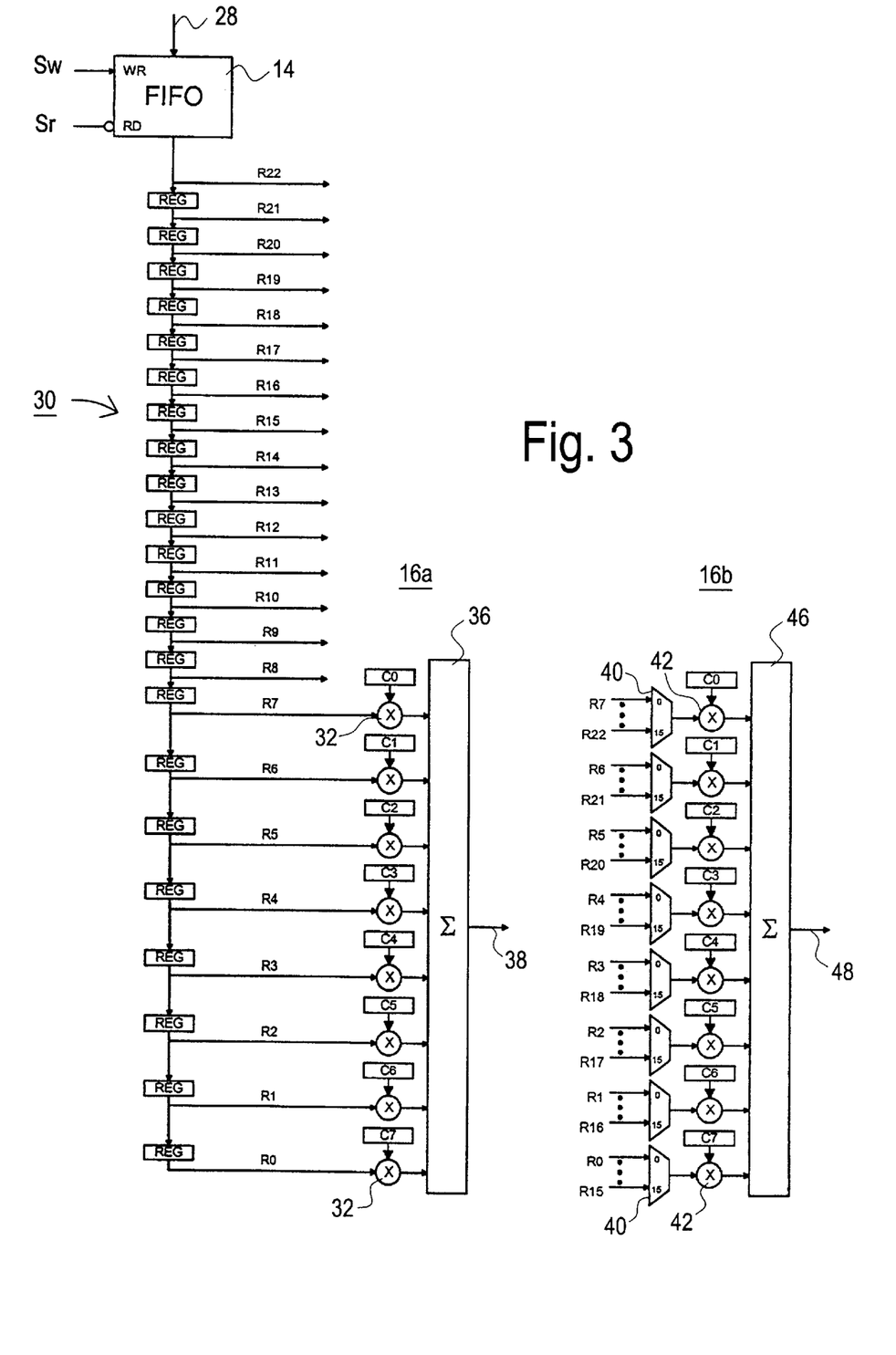
FIG. 3 illustrates in block diagram form an embodiment of the present invention in which a plurality of filter processing paths share a common set of delay registers.

FIG. 3 illustrates one embodiment of the interpolation filters 16a,16b of FIG. 1. In this embodiment the FIFO 14 receives digital echo signals at an input 28, which are written sequentially into the FIFO memory after the steering delay expires by a write strobe signal Sw. The echo signals are read out of the FIFO memory and into a multi-register pipeline by a read strobe signal Sr. Dynamic coarse focusing of the primary beam is provided by inhibiting the read strobe to the FIFO and the clock-enable control to the subsequent multi-register pipeline. This technique is described in the aforementioned Lipschutz patent ("stalling" the read address counter) and in U.S. Pat. No. 4,173,007 (McKeighen et al.) ("edit-splice" technique).

The output of the FIFO 14 is coupled to the input of the multi-register pipeline 30. The length of the pipeline 30 is (T+D−1), where T is the number of taps of an interpolation filter and (D−1) is the maximum coarse focus delay difference (delta) between the multiple beams being simultaneously processed. Typical values for T and D can be 8 and 16 respectively, which results in a 23-stage pipeline as shown by the 23 REG stages in the drawing. An 8-tap FIR interpolation filter 16a is coupled to the taps of the final T stages of the pipeline 30 as shown by the connections from the taps R0–R7 of the pipeline to the eight multipliers 32 of the filter. Effectively, the final T stages of the pipeline 30 form the delay elements of the FIR filter 16a. The multipliers 32 multiply each received echo sample by a coefficient produced by a respective one of coefficient registers C0–C7. The N sets of filter coefficients provide fine-focus capability at a resolution of 1/N of the A/D converter sampling clock period. For instance if the A/D converter samples at 40 MHz and a 4-phase interpolation filter is used then an effective focus resolution of 160 MHz (6.25 ns) is achieved. The coefficient set is selected each clock cycle from the N sets to give the desired dynamic fine focus for the corresponding output sample. The products of the eight multipliers 32 are combined by a summing circuit 36 to produce partially summed signals of a primary beam at interpolation filter output 38.

A second and any additionally required beams are provided by interpolation filters such as that shown at 16b in FIG. 3. Like filter 16a, filter 16b comprises eight multipliers 42 with coefficient registers C0–C7, coupled to a summing circuit 46 which produces a partially summed signal of a second beam at an output 48. This filter is preceded by a set of D-to-1 multiplexers 40. In this example each of the multiplexers 40 is a 16:1 multiplexer coupled to a different sequence of sixteen consecutive taps of the pipeline 30. The multiplexers 40 allow the inputs to the filter multipliers 42 to be connected to any contiguous set of T pipeline stages within the range of the pipeline length. The multiplexers 40 are dynamically controlled in synchronism to effect a coarse focus offset from the primary beam, and to compensate for those times when dynamic coarse focusing updates are made to the primary beam using the FIFO 14, as previously described.

Figure 4:
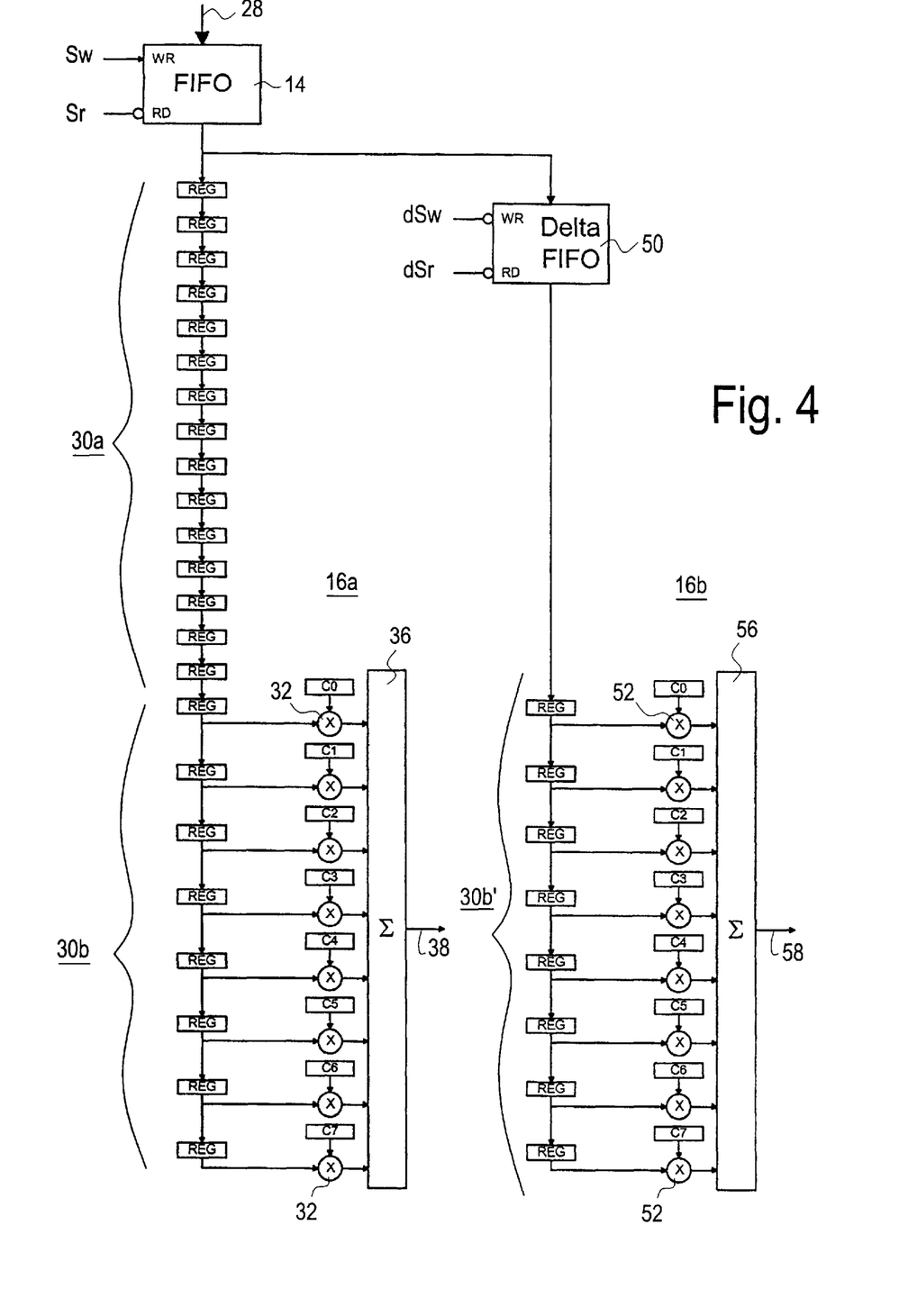
FIG. 4 illustrates in block diagram form an embodiment of the present invention in which one filter processing path utilizes a delay register and others utilize delta FIFOs.

FIG. 4 illustrates a variation of the embodiment of FIG. 3 in which the function of the multiplexers 40 is provided by a delta FIFO 50. The echo signal samples produced by the bulk delay FIFO 14 are applied to the pipeline 30 which is coupled to the interpolation filter 16a as previously described. In this drawing the (D−1) portion of the pipeline 30 is indicated by 30a and the T portion of the pipeline is indicated by 30b. The echo signal samples produced by the bulk delay FIFO 14 are also applied to a delta FIFO 50 which, by virtue of its write and read strobe controls dSw and dSr, provides a smaller variable delay to the interpolation filter 16b. To afford the same function as the multiplexers in the previous example, the delta FIFO 50 has a maximum depth of D samples, allowing the beam produced by filter 16b to be offset from the primary beam by a dynamic value of between 0 and D−1 samples. A delta FIFO of greater depth enables the beam produced by the second interpolation filter to be referenced before or after (i.e., on either side spatially) of the primary beam produced by filter 16a. When a coarse focus update is applied to the read control of the bulk delay FIFO 14, a write strobe signal dSw is also applied to the write control of the delta FIFO 50 to keep the two in synchronism. Unique coarse focus updates are also applied to the read control input of the delta FIFO 50 to uniquely dynamically focus the secondary beam produced by filter 16b. The echo signal samples produced by the delta FIFO 50 are applied to a smaller pipeline register 30b', equal to T, which in this example is eight and forms the delay elements of the FIR filter 16b. The eight taps of the pipeline 30b' are coupled to the inputs of an FIR filter having multipliers 52, coefficient registers C0–C7, and a summing circuit 56 arranged as described for filter 16a to produce partial sum signals of a second beam at output 58. Additional beams can be provided by additional interpolation filters having elements 50–58 and 30b' in parallel with the illustrated filter 16b.

Figure 5:
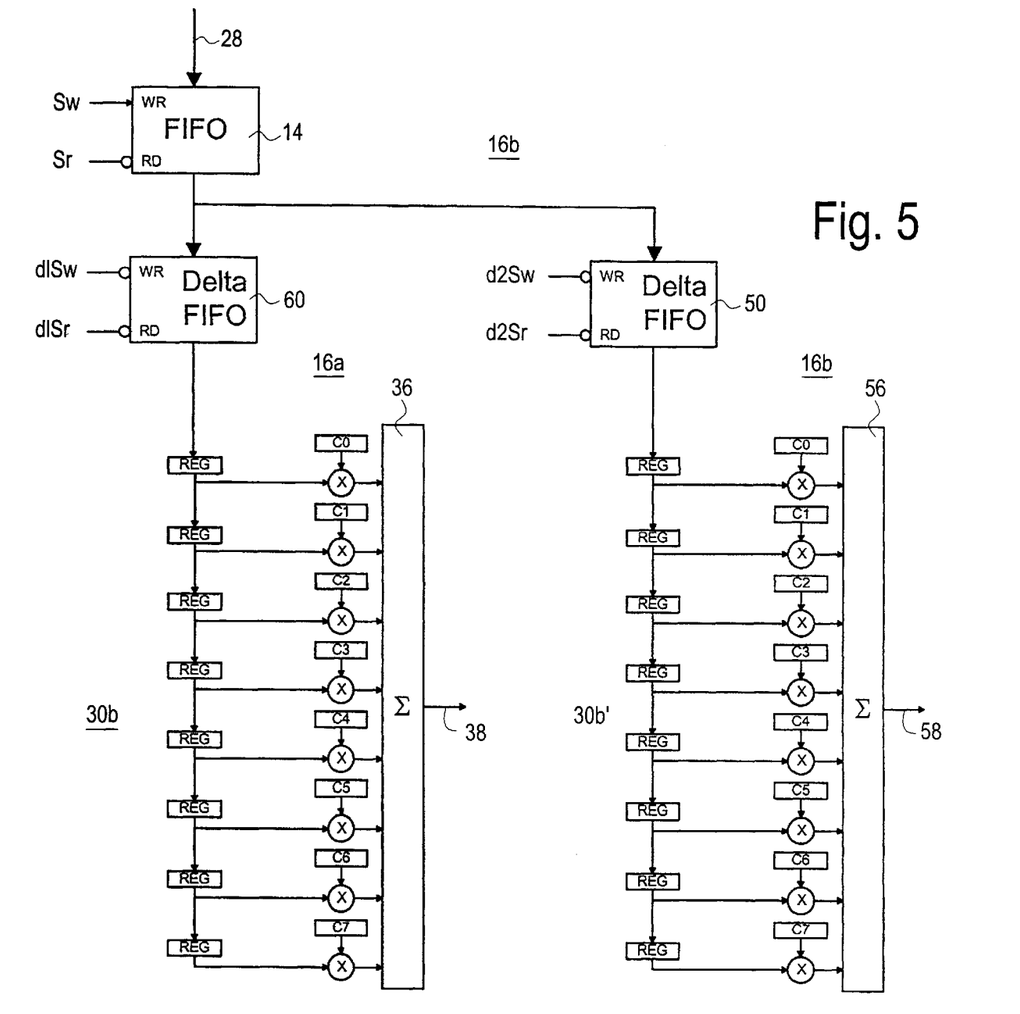
FIG. 5 illustrates in block diagram form an embodiment of the present invention in which all filter processing paths utilize delta FIFOs.

FIG. 5 illustrates a variation of the embodiment of FIG. 4 in which the (D−1) portion 30a of the primary beam pipeline is replaced by another delta FIFO 60. With a variable delay 60 instead of a fixed delay 30a in this position, the delay of signal 38 can be either greater or less than that of signal 58, and so on. Consequently there is no longer a "primary" beam in this embodiment as both beams are independently variably focused by separate control of the delta FIFOs. This is done by separately controlling the coarse focus delays of the two beams by separate control of their read enable strobe signals, d1Sr and d2Sr. The write controls for the delta FIFOs and the read control for the bulk delay FIFO 14 all operate in synchronism, and occur only if one or both of the delta FIFOs are nearly empty. In effect, the bulk delay FIFO 14 provides common steering and focusing delays for the two beams and the delta FIFOs provide the small differential steering and focus delays between the two beams. The illustrated embodiment can be extended to produce more multiple beams by replicating the parallel filter arrangements including the delta FIFOs and FIR filters.

Figure 6:
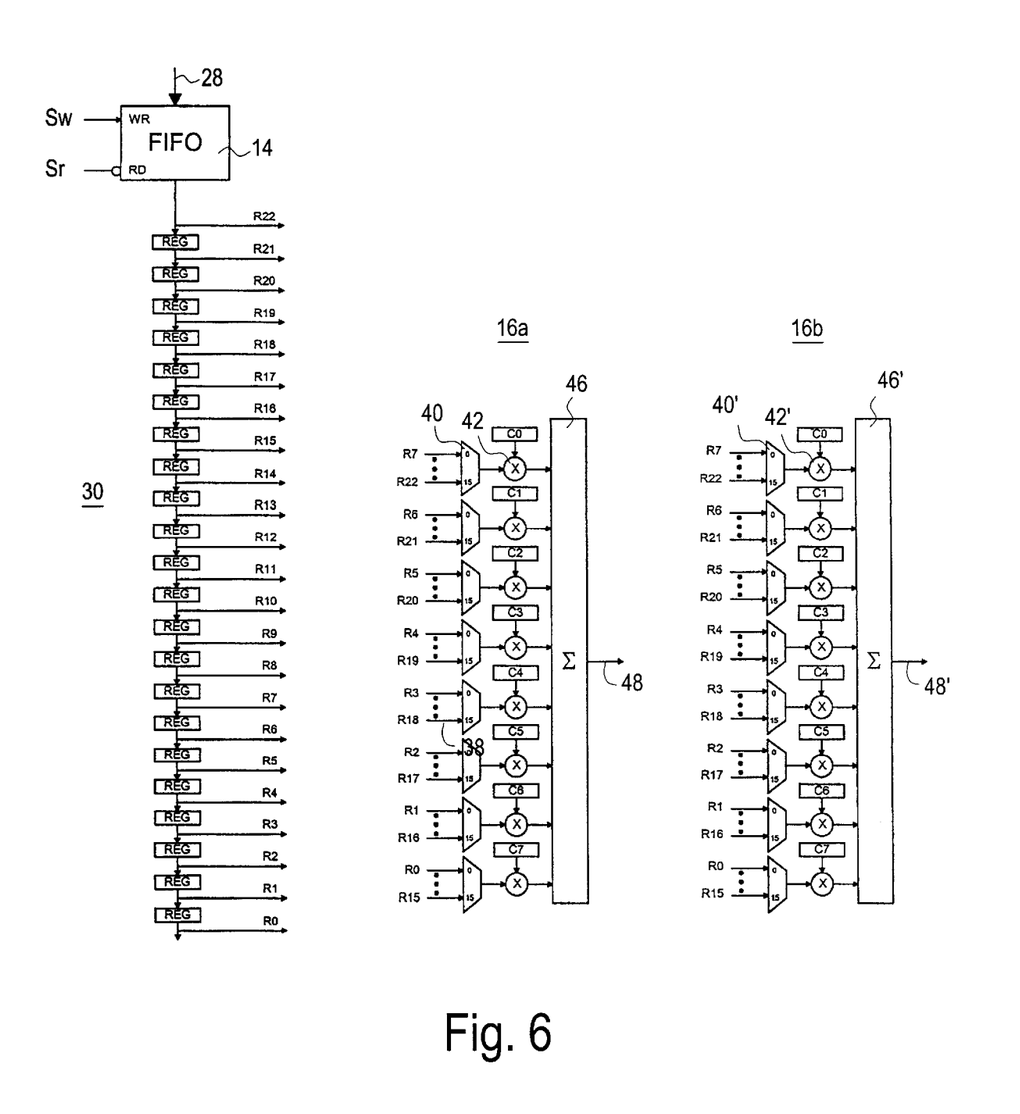
FIG. 6 illustrates in block diagram form a variation of the embodiment of FIG. 3 which allows each filter to be time multiplexed between multiple data paths.

FIG. 6 illustrates a further embodiment of the present invention which is a variation of the embodiment of FIG. 3. In this embodiment the first interpolation filter 16a and the second interpolation filter 16b both receive their input signal samples from D-to-1 multiplexers 40 and 40' coupled to the pipeline 30. In addition, the multiplexers 40,40' the multipliers 42,42', the coefficient registers C0–C7 of both filters and the summing circuits 46,46' are operated at twice the clock frequency of the A/D converter. For each clock period of the A/D sampling clock, two sets of filter input samples are provided by the multiplexers and two sets of filter coefficients are applied, one during each half of the sampling clock cycle. Thus the interpolation filters are time multiplexed to produce samples for two time-interleaved beams, each with its own independent fine and coarse delay settings. Beams 1 and 2 are produced at output 48, and beams 3 and 4 are produced at output 48'. As an illustration, if the A/D converter is sampling the received echo signals at a 40 MHz rate, each of the interpolation filters 16a and 16b is producing output samples at an 80 MHz rate. Each filter output produces samples of two time interleaved beams. This arrangement can be extended for additional multiple beams by time interleaving more than two beams through a filter and/or adding additional parallel filters beyond the two (16a,16b) shown in the drawing.

Figure 7:
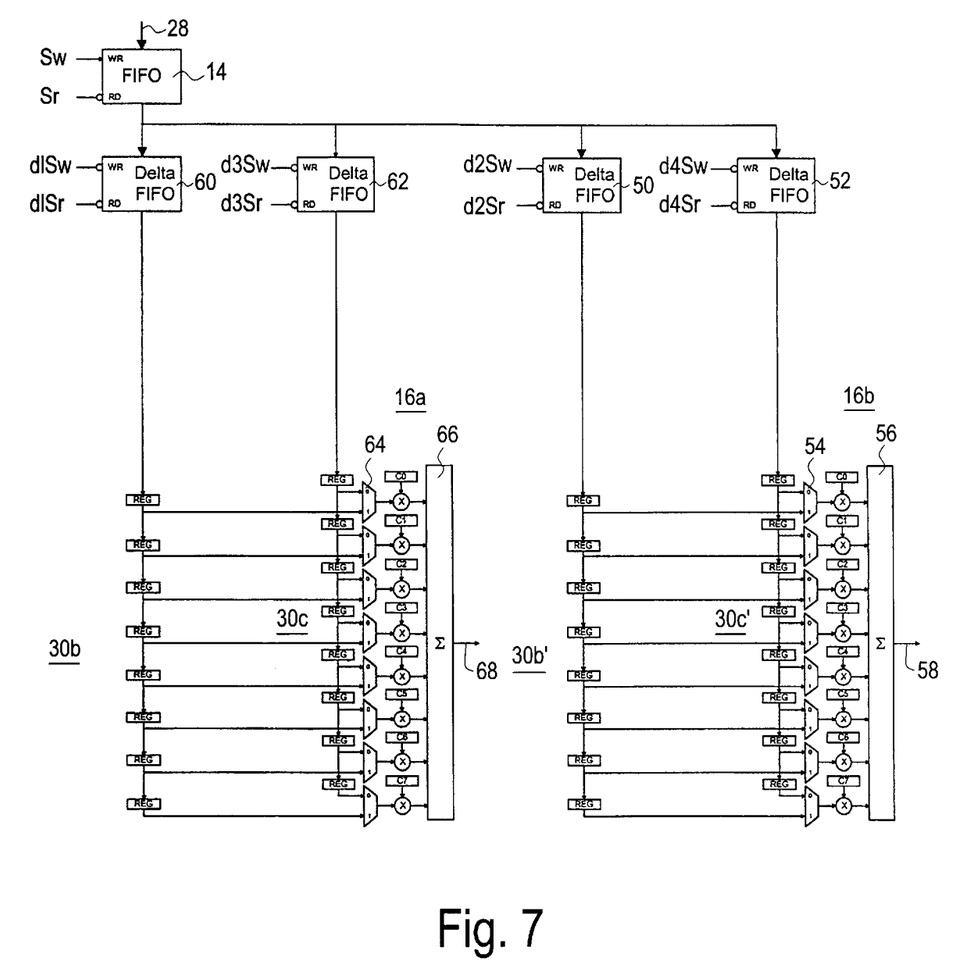
FIG. 7 illustrates in block diagram form a variation of the embodiment of FIG. 5 which allows each filter to be time multiplexed between multiple data paths.

FIG. 7 illustrates a further embodiment of the present invention which applies the delta FIFO approach to the previous time multiplexed embodiment. This advantageously replaces the D-to-1 multiplexers of the FIG. 6 embodiment with 2:1 multiplexers 54 and 64. Four delta FIFOs 60, 62, 50, and 52 are coupled to the bulk delay FIFO 14 to provide four independently adjustable fine delays for the four beams being formed. The output of each delta FIFO is coupled to a pipeline 30b, 30b', 30c, and 30c' of length T, the taps of which are coupled to the inputs of 2:1 multiplexers. The multiplexers alternate between the input signals of 30b and 30c; and 30b' and 30c', respectively, thereby alternately providing samples for two beams to the interpolation filters. The coefficients of the filters switch in synchronism with the input signals to switch between the fine focus settings required by the four beams. Beams 1 and 2 are produced in a multiplexed, time-interleaved fashion at filter output 68, and beams 3 and 4 are produced in the same manner at filter output 58.

Figure 8:
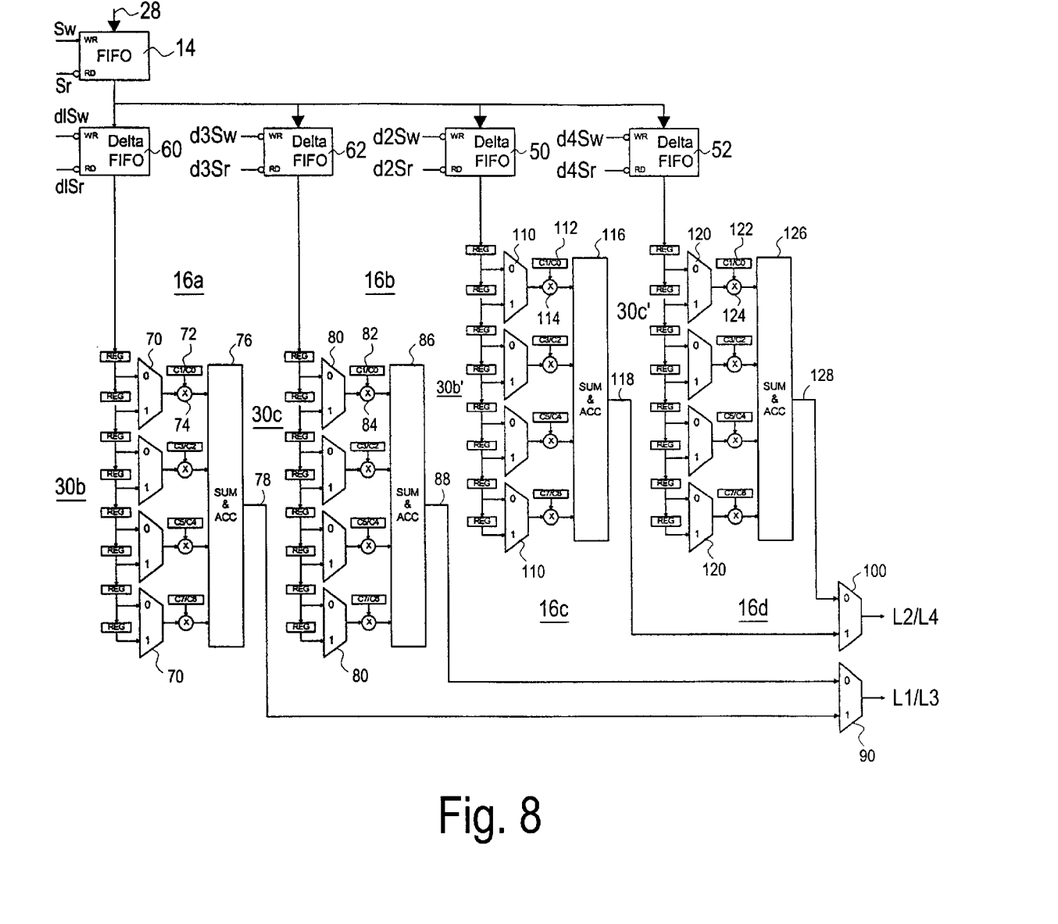
FIG. 8 illustrates in block diagram form a variation of FIG. 5 which allows each multiplier within a filter to be time multiplexed between multiple filter taps.

FIG. 8 illustrates a variation of the previous embodiment in which each interpolation filter produces a single beam. But rather than multiplex different beams through a filter as shown in FIG. 7, this embodiment multiplexes the taps of the filters. Within each filter the multipliers are time multiplexed to reduce the number of multipliers needed by each filter, as multipliers provide undesired ASIC complexity. In interpolation filter 16a for example, four 2-input multiplexers 70 are alternately switched between different taps of the T-length pipeline 30b. During one A/D sampling period two tap sets and coefficient sets are used in each interpolation filter. During the first half cycle the even-numbered taps of the pipeline are applied to the filter, multiplied by a coefficient set [C0,C2,C4,C6], and summed and accumulated at 76. During the second half cycle the odd-numbered tap signals are applied to the filter, multiplied by a coefficient set [C1,C3,C5,C7], and combined with those accumulated at 76 during the first half cycle. Thus an eight-tap filter is realized in two half-cycle steps of four taps using four multipliers. The four interpolation filters 16a, 16b, 16c, and 16d are all operated in this manner. If desired, the four output beams can be put onto two data busses instead of four by time-interleaving the samples of two beams on one bus. This is done by multiplexers 90 and 100, which produce alternate samples of lines L1 and L3 at one multiplexer output and alternate samples of lines L2 and L4 at another multiplexer output. This embodiment can be extended for higher order multiline by the addition of more parallel FIFOs and FIR filters, and/or to higher order multiplexing by sharing each multiplier across more than two taps.

It is seen that various clock rates are used at various points in the FIG. 8 embodiment. For example if the A/D sampling clock is 40 MHz, the FIFO 14, the delta FIFOs 50, 52, 60, 62, and the pipeline registers 30b, 30b', 30c, 30c' are all operated at a 40 MHz clock rate. The multiplexers 70, 80, 110, and 120 of the interpolation filters, the multipliers 74, 84, 114 and 124, and the coefficient registers 72, 82, 112, and 122 are all effectively operated at 80 MHz to produce two filter partial sums in one sampling clock cycle. The beam data rates of the four beams at the filter outputs 78, 88, 118, and 128 are at the original sampling rate of 40 MHz. If the beams are time interleaved by multiplexers the multiplexed output samples are produced at the 80 MHz rate.

From a system timing perspective, the embodiment of FIG. 8 can be designed to operate as follows. The digital echo information from the transducer element and the A/D converter is written into the FIFO 14 after a period corresponding to the steering delay for the multiple lines. The data is read out of FIFO 14 and into the delta FIFOs at timing corresponding to a coarse delay common to all four lines and when all channels in the system contain samples. The data is read out of each of the delta FIFOs at a respective time corresponding to the coarse steering and focus delay for the beam with which the delta FIFO is associated. The interpolation filters 16a, 16b, 16c, and 16d provide the fine steering and focusing delay for each of the respective lines L1, L2, L3 and L4.

Figure 9:
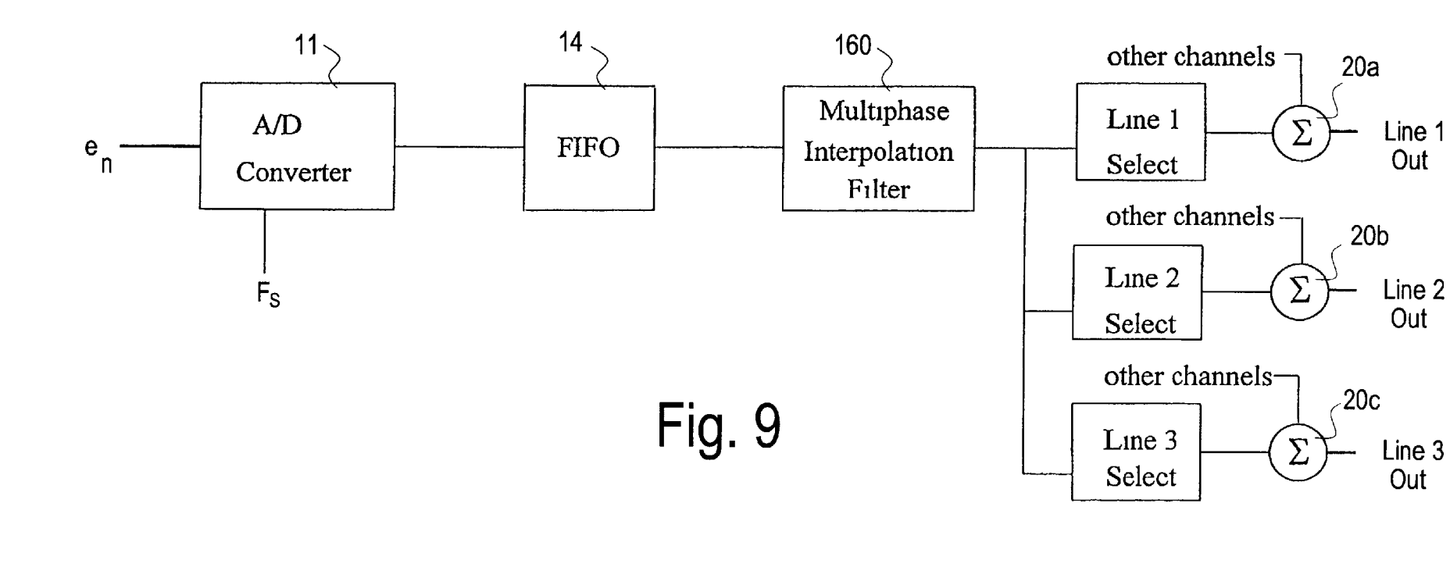
FIG. 9 illustrates in block diagram form a first embodiment of the present invention in which the samples for all beams are produced by a common multiphase interpolation filter.

FIG. 9 illustrates an embodiment of the present invention which is particularly attractive for higher-order multiline beamforming. Higher-order multiline refers to the production of a large number of lines in response to a single transmit event. For real time 3D imaging, higher order multiline is a promising approach for scanning a volumetric region at real time frame rates. However, with higher order multiline requirements come greater hardware complexity and expense. FIG. 9 shows an embodiment which reduces hardware complexity for higher-order multiline applications.

The previous embodiments contained one interpolation filter for each multiple line in the non-time-multiplexed embodiments. Thus, if four multilines are to be produced in response to each transmit event, four FIR interpolation filters are required, each one capable of producing a signal of a fractional phase of the sampling period when needed. If each interpolation filter has eight taps, the beamformer channel requires a total of 32 taps, which implies a hardware requirement of 32 hardware-intensive multipliers. But when sixteen multilines are to be produced in response to each transmit event, as may be required for real time 3D imaging, sixteen FIR interpolation filters are required. If each interpolation filter has eight taps, the beamformer channel requires a total of 128 taps, which implies a hardware requirement of 128 hardware-intensive multipliers. Moreover, the sixteen interpolation filters may at times exhibit redundant operation. Specifically, an interpolated sample produced by one filter at one point in time for one multiline may also be produced by another filter coupled to the same element $e_m$ at another point in time for another multiline.

The present inventors have discovered a variation of the present invention which is advantageous when the multiline order K (the number of simultaneously produced beams) is greater than the interpolation factor L (the number of phases of the interpolation filter), which is usually the case for higher-order multiline beam-forming. In such an embodiment a single interpolation filter produces all of the differently phased signal samples required for all of the multilines. Preferably the filter uses different coefficient sets to calculate all possible interpolated samples, even if some are never used. The samples are then directed to and processed through the multiline paths in which they are needed.

One example of a system of this design is shown in FIG. 9. The signals received by a transducer element em are applied to A/D converter 11, where they are digitized at a sampling frequency Fs. The signal samples are coupled to FIFO 14, where they undergo a bulk delay. The delayed samples are then applied to a multiphase interpolation filter 160, which is preferably an FIR filter operating in the same manner as the previously described filters to produce all of the signal phases needed by the multilines to be produced. The single multiphase interpolation filter is shared by all of the multiline processing paths of the channel for element $e_n$. Each path contains a selector which selects the particular samples needed for a particular multiline. A line 1 selector selects the samples needed for multiline #1, a line 2 selector selects the samples needed for multiline #2, a line 3 selector selects the samples needed for multiline #3, and so forth. The samples selected for each line are combined with the correspondingly timed samples produced for the corresponding multiline from the other channels (elements) of the beamformer by summing circuits 20a–20c.

The interpolation factor L is calculated from knowledge of the A/D converter sampling rate, the operating frequency $f_c$ of the transducer, and the desired delay resolution. There comes a point where increasing the delay resolution produces little or no improvement in image quality. Typically that point is a delay resolution of 1/16 of the period corresponding to $1/f_c$ (or $\lambda/16$) Therefore, if the sampling rate Fs is 24 MHz, the frequency of the transducer is 7.5 MHz, and the desired delay resolution is $\lambda/16$, L is calculated by $L=16f_c/f_s$ for which L=5. For a 5 MHz transducer sampled at 30 MHz with the same delay resolution, L is 2.66, which is rounded up to 3.

The efficiency of this embodiment for higher-order multiline can be appreciated by considering the number of taps required for the interpolation filters, which determines the number of multipliers needed in the hardware. For 4× multiline (four beams produced in response to one transmit event) and using interpolation filters as described above which have eight taps, it is seen that 4 filters times 8 taps per filter is 32. From the above example, using a representative value for L such as L=4, a single multiphase interpolation filter can also be constructed to have four phases for eight taps for 4× multiline operation, and 1 filter times 8 taps times 4 phases is 32. Thus, there is no savings evident in the use of a multiphase filter for such low-order multiline. But consider the 16× example given above, where 16 filters times 8 taps per filter is 128. When a 4-phase interpolation filter with eight taps per phase is used, the result is again 32, a considerable savings in multipliers. In other words, the number of filter taps (multipliers) is independent of the multiline order with this embodiment.

Figure 10:
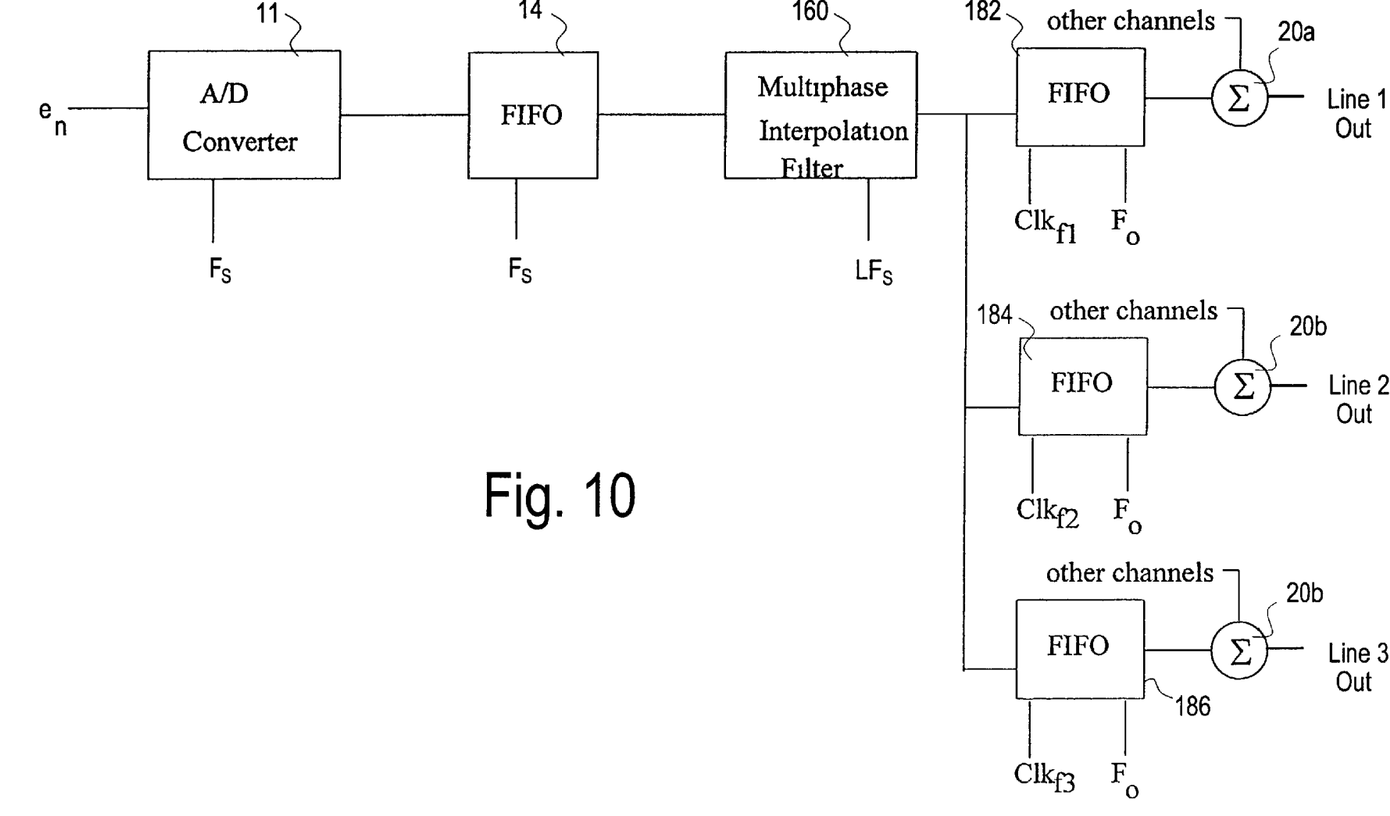
FIG. 10 illustrates in block diagram form a second embodiment of the present invention in which the samples for all beams are produced by a common multiphase interpolation filter.

FIG. 10 illustrates another embodiment of a multiline beamformer channel using a multiphase interpolation filter. In this embodiment the transducer echo signals are sampled at a frequency Fs and are written into the shared coarse steering delay FIFO 14 at the same frequency. The multiline interpolation filter 160 is operated at a frequency of $LF_s$. If the multiline interpolation filter is a four phase filter, this would mean that a 40 MHz sampling frequency would result in the multiphase interpolation filter operating at an output sample rate of 160 MHz. Selected ones of the multi-phased samples produced by filter 160 are clocked into a FIFO in each of the multiline processing paths, shown as 182, 184, and 186 in the drawing. The write signals for these FIFOs are $Clk_{f1}$, $Clk_{f2}$, and $Clk_{f3}$, with each of these signals having a basic periodicity which is updated periodically and independently for dynamic focusing. The multiline data is read out of each of the multiline FIFOs by a fixed output clock $F_o$, which can be the same for all multilines. Synchronization of the output clocks allows all the multilines to be formed at the same time, and to be simultaneously combined with the samples from the other transducer elements by summing circuits 20a, 20b, and 20c.

What is claimed is:

1. A digital multiline beamformer including a plurality of channels, each of which is coupled to an element of an array transducer to produce steered and focused digital signal samples of a plurality of beams in response to a single transmit event comprising:

an analog to digital converter, coupled to receive signals produced by a transducer element, which produces a sequence of digital signal samples at a sampling rate;

a bulk delay, coupled to receive the digital signal samples produced by the analog to digital converter, which applies a common steering delay to the digital signal samples; and a plurality of parallel filter processing paths, each having an input coupled to receive the delayed digital signal samples produced by the bulk delay which simultaneously produce digital signal samples for a plurality of beams which further exhibit fine focus delays calculated for the respective beams; and a plurality of summing circuits, each coupled to receive digital signal samples processed by the filter processing paths, which combine digital signal samples produced by a plurality of channels of the beamformer.

2. The digital multiline beamformer of claim 1, wherein the parallel filter processing paths comprise a delay register having an input coupled to the bulk delay and a plurality of output taps; and a plurality of interpolation filters each having a plurality of input taps coupled to the output taps of the delay register, and each having an output at which signal samples of a beam which have undergone fine focus delays are produced.

3. The digital multiline beamformer of claim 2, wherein at least one of the interpolation filters includes input taps which can be variably connected to a different set of output taps of the delay register during processing of an ultrasound beam.

4. The digital multiline beamformer of claim 3, wherein at least one of the interpolation filters includes multiplexers which variably connect the input taps of the filter to a different set of output taps of the delay register during processing of an ultrasound beam.

5. The digital multiline beamformer of claim 3, wherein the bulk delay comprises a first in, first out memory device.

6. The digital multiline beamformer of claim 2, wherein each of the interpolation filters includes input taps which can be variably connected to a different set of output taps of the delay register during processing of an ultrasound beam.

7. The digital multiline beamformer of claim 1, wherein the parallel filter processing paths comprise a delay register having an input coupled to the bulk delay and a plurality of output taps;

a multibeam delay having an input coupled to the bulk delay and having an output at which digital signal samples are produced which have undergone a delay appropriate to a particular beam; and a plurality of interpolation filters, one of which has a plurality of input taps coupled to the output taps of the delay register, and another of which has a plurality of input taps coupled to the output of the multibeam delay, and each having an output at which signal samples of a beam which have undergone fine focus delays are produced.

8. The digital multiline beamformer of claim 7, further comprising a second delay register having an input coupled to the output of the multibeam delay, and a plurality of output taps, wherein the input taps of one of the interpolation filters is coupled to the output taps of the second delay register.

9. The digital multiline beamformer of claim 7, wherein the multibeam delay comprises a first in, first out memory device.

10. The digital multiline beamformer of claim 1, wherein a plurality of the parallel filter processing paths each comprise:

a multibeam delay having an input coupled to the bulk delay and having an output at which digital signal samples are produced which have undergone a delay appropriate to a particular beam; and a plurality of interpolation filters, each of which has a plurality of input taps coupled to the output of a multibeam delay, and each having an output at which signal samples of a beam which have undergone fine focus delays are produced.

11. The digital multiline beamformer of claim 10, further comprising a plurality of delay registers each having an input coupled to the output of a multibeam delay, and a plurality of output taps, wherein the input taps of the interpolation filters are coupled to the output taps of the delay registers.

12. The digital multiline beamformer of claim 1, wherein the parallel filter processing paths each comprise first and second multibeam delays having inputs coupled to the bulk delay and each having an output at which digital signal samples are produced which have undergone a delay appropriate to a particular beam; and an interpolation filter having input taps coupled to the outputs of the first and second multibeam delays, and an output at which signal samples of beams which have undergone fine focus delays are produced.

13. The digital multiline beamformer of claim 12, wherein the input taps of the interpolation filter include means for alternately connecting the input taps to the outputs of the first and second multibeam delays.

14. The digital multiline beamformer of claim 12, further comprising first and second delay registers having respective inputs coupled to the outputs of the first and second multibeam delays, and a plurality of output taps coupled to the input taps of the interpolation filter.

15. The digital multiline beamformer of claim 14, further comprising a plurality of multiplexers having inputs coupled to the output taps of the first and second delay registers, and outputs coupled to the input taps of the interpolation filter.

16. The digital multiline beamformer of claim 1, wherein the parallel filter processing paths each comprise a multibeam delay having inputs coupled to the bulk delay and each having an output at which digital signal samples are produced which have undergone a delay appropriate to a particular beam; and an interpolation filter having input taps coupled to the output of a multibeam delay, and an output at which signal samples a beam which has undergone fine focus delays is produced.

17. The digital multiline beamformer of claim 16, further comprising a plurality of delay registers each having an input coupled to the output of a multibeam delay, and a plurality of output taps; and means for alternately connecting different output taps of a delay register to the input taps of an interpolation filter.

18. The digital multiline beamformer of claim 17, wherein the means for alternately connecting comprise multiplexers.

19. The digital multiline beamformer of claim 18, wherein each alternate connection of a set of output taps of a delay register to an interpolation filter produces a partial sum of a digital signal sample of a beam.

20. The digital multiline beamformer of claim 19, wherein the alternate connection of two sets of output taps of a delay register to an interpolation filter produces a complete sum of a digital signal sample of a beam.

21. The digital multiline beamformer of claim 16, further comprising means, coupled to the outputs of a plurality of interpolation filters, for time interleaving signal samples of a plurality of beams.

22. A digital multiline beamformer including a plurality of channels, each of which is coupled to an element of an array transducer to produce steered and focused digital signal samples of a plurality of beams in response to a single transmit event comprising:

an analog to digital converter, coupled to receive signals produced by a transducer element, which produces a sequence of digital signal samples at a sampling rate;

a channel bulk delay, having an input coupled to receive the digital signal samples produced by the analog to digital converter and having an output, which applies a common steering delay to the digital signal samples for a plurality of beams;

a plurality of multiline delays, each having an input coupled to the output of the channel bulk delay and an output, which applies a coarse focus delay for a particular beam to received digital signal samples; and a plurality of filters, each having an input coupled to the output of a multiline delay and an output, which applies a fine focus delay for a particular beam to received digital signal samples; and a plurality of summing circuits, each coupled to the output of a filter, which combine digital signal samples produced by a plurality of channels of the beamformer.

23. The digital multiline beamformer of claim 22, wherein each filter has an input coupled to the outputs of a plurality of multiline delays, which applies a fine focus delay for a plurality of beams to received digital signal samples.

24. The digital multiline beamformer of claim 22, wherein the channel bulk delay and the multiline delays comprise first in, first out memory devices.

25. The digital multiline beamformer of claim 22, wherein each filter is a time multiplexed filter.

26. The digital multiline beamformer of claim 25, wherein each filter has a plurality of input taps, and wherein the input taps are time multiplexed between different sets of input signals.

27. The digital multiline beamformer of claim 26, further comprising a plurality of tapped delay lines each having an input coupled to the output of a multiline delay and a plurality of output taps coupled to the input taps of a filter.

28. A digital multiline beamformer including a plurality of channels, each of which is coupled to an element of an array transducer to produce steered and focused digital signal samples of a plurality of beams in response to a single transmit event comprising:

an analog to digital converter, coupled to receive signals produced by a transducer element, which produces a sequence of digital signal samples at a sampling rate;

a channel bulk delay, having an input coupled to receive the digital signal samples produced by the analog to digital converter and having an output, which applies a common delay to the digital signal samples for a plurality of beams;

a multiphase interpolation filter having an input coupled to the output of the channel bulk delay and having an output at which differently delayed signal samples for a plurality of beams is produced;

a plurality of selectors each having an input coupled to the output of the multiphase interpolation filter and each of which selects delayed signal samples for a particular beam; and a plurality of summing circuits, each coupled to the output of a selector, which combine digital signal samples produced by a plurality of channels of the beamformer.

29. The digital multiline beamformer of claim 28, wherein the selectors comprise a plurality of memory devices, each of which is responsive to a data input corresponding to a desired receive beam, and each of which exhibits a common output data rate.

30. The digital multiline beamformer of claim 29, wherein the channel bulk delay is operated at the sampling rate, wherein the multiphase interpolation filter is operated at L times the sampling rate, wherein the data inputs of the memory devices are operated at the rates at which data samples for a respective beam are produced by the multiphase interpolation filter, and wherein the common output data rate is independent of the sampling rate.

31. The digital multiline beamformer of claim 30, wherein L is the interpolation factor of the interpolation filter.

32. The digital multiline beamformer of claim 31, wherein the number of beams produced in response to a single transmit event is greater than the interpolation factor L.

33. The digital multiline beamformer of claim 28, wherein at least one of the digital signal samples produced by the multiphase interpolation filter during a transmit event is utilized by a plurality of beams.

* * * * *